(12) United States Patent
Lin (10) Patent No.: US 8,978,209 B1
(45) Date of Patent: Mar. 17, 2015

(54) HINGE STRUCTURE

(71) Applicant: Che-Hsien Lin, Taipei (TW)

(72) Inventor: Che-Hsien Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 14/267,934

(22) Filed: May 2, 2014

Related U.S. Application Data (60) Provisional application No. 61/870,204, filed on Aug. 26, 2013.

(51) Int. Cl.
| | | |
|---|---|---|
| *E05D 7/00* | (2006.01) | |
| *F16H 19/08* | (2006.01) | |
| *E05D 11/08* | (2006.01) | |
| *E05D 3/06* | (2006.01) | |

(52) U.S. Cl.
CPC .................................... *E05D 3/06* (2013.01)
USPC .............................. 16/366; 16/303; 16/337

(58) Field of Classification Search
CPC ............... E05D 3/12; E05D 3/06; E05D 3/10; G06F 1/1681; G06F 1/1616; G06F 1/1618; E05Y 2900/606; H04M 1/0216; H04M 1/0222; H04M 1/022; H05K 5/0226
USPC .......... 16/366, 368, 369, 340, 337, 334, 389, 16/357, 360, 361, 342, 330, 303; 361/679.6, 679.9, 679.17, 679.27; 248/917–923, 284.1; 379/433.12, 379/433.13; 455/575.1, 575.3, 575.4, 455/550.1, 90.3; 348/333.06, 373, 794

See application file for complete search history.

(56) References Cited

U.S. PATENT DOCUMENTS

| 1,200,538 | A | * | 10/1916 | Smith et al. ..................... 16/303 |
|---|---|---|---|---|
| 5,600,868 | A | * | 2/1997 | Tourville et al. ................ 16/277 |
| 6,647,593 | B2 | * | 11/2003 | Iguchi et al. ..................... 16/386 |
| 7,140,074 | B2 | * | 11/2006 | Han et al. ......................... 16/366 |
| 7,512,426 | B2 | * | 3/2009 | Maatta et al. .............. 455/575.1 |
| 7,515,707 | B2 | * | 4/2009 | Ka et al. ..................... 379/433.12 |
| 7,913,356 | B2 | * | 3/2011 | Duan et al. ...................... 16/303 |
| 2004/0194256 | A1 | * | 10/2004 | Chen et al. ...................... 16/366 |
| 2006/0112516 | A1 | * | 6/2006 | Chen et al. ...................... 16/330 |
| 2008/0155784 | A1 | * | 7/2008 | Hsu et al. ......................... 16/303 |
| 2009/0007380 | A1 | * | 1/2009 | Feng et al. ....................... 16/305 |
| 2009/0282650 | A1 | * | 11/2009 | Jin et al. .......................... 16/367 |
| 2010/0251518 | A1 | * | 10/2010 | Chiang ............................ 16/277 |
| 2011/0289726 | A1 | * | 12/2011 | Zhang et al. .................... 16/250 |
| 2012/0192381 | A1 | * | 8/2012 | Zhang et al. .................... 16/366 |
| 2012/0309470 | A1 | * | 12/2012 | Park et al. .................. 455/575.3 |
| 2013/0111704 | A1 | * | 5/2013 | Mitsui .............................. 16/250 |
| 2013/0125809 | A1 | * | 5/2013 | Gracyalny et al. ............ 116/228 |
| 2013/0152342 | A1 | * | 6/2013 | Ahn et al. ....................... 16/354 |
| 2013/0318746 | A1 | * | 12/2013 | Kuramochi ..................... 16/342 |
| 2014/0223693 | A1 | * | 8/2014 | Hsu .................................. 16/282 |

FOREIGN PATENT DOCUMENTS

JP          2007064427  A  *  3/2007

* cited by examiner

*Primary Examiner* — Chuck Mah
(74) *Attorney, Agent, or Firm* — Jianq Chyun IP Office (57) ABSTRACT

A hinge structure includes a first shaft, a second shaft, a sliding component, a first pillar, and a second pillar. The second shaft is parallel to the first shaft. The sliding component includes a first sliding portion and a second sliding portion, wherein the first shaft and the second shaft are disposed through the first sliding portion and the second sliding portion respectively, and the first sliding portion has a first guiding slot and the second sliding portion has a second guiding slot. When the first shaft rotates with respect to the sliding component and moves the first pillar along the first guiding slot, the first pillar drives the sliding component to slide along the first and second shafts and move the second pillar along the second guiding slot, so as to drive the second shaft to rotate with respect to the sliding component.

10 Claims, 10 Drawing Sheets

HINGE STRUCTURE

CROSS-REFERENCE TO RELATED APPLICATION

This application claims the priority benefits of U.S. Provisional Application Ser. No. 61/870,204, filed on Aug. 26, 2013. The entirety of the above-mentioned patent application is hereby incorporated by reference herein and made a part of this specification.

BACKGROUND OF THE INVENTION

1. Field of the Invention

The invention relates to a hinge structure and more particularly relates to a hinge structure with two shafts.

2. Description of Related Art

A notebook computer provides the same functions as a general desktop computer; and what is more, the notebook computer is designed to be thin and light, which makes it portable. For this reason, notebook computer has become an indispensable portable tool for some users. As the prices of notebook computers continue to decline, some users have used notebook computers to replace their desktop computers.

Generally speaking, the notebook computer is composed of a base and a display. In order that the notebook computer can provide diverse operations and usages to satisfy the users' demands, the displays of some notebook computers can be flipped over to the rear side of the base, so that the notebook computer can be used as a tablet computer. Therefore, the design of the hinge structure for notebook computers also needs to be improved such that the user can smoothly flip the display over to the rear side of the base.

SUMMARY OF THE INVENTION

The invention provides a hinge structure for smoothly flipping a display of an electronic device over to a rear side of a base.

The hinge structure of the invention includes a first shaft, a second shaft, a sliding component, a first pillar, and a second pillar. The second shaft is parallel to the first shaft. The sliding component includes a first sliding portion and a second sliding portion, wherein the first shaft and the second shaft are disposed through the first sliding portion and the second sliding portion respectively, and the first sliding portion has a first guiding slot and the second sliding portion has a second guiding slot. The first pillar is connected with the first shaft and extends into the first guiding slot. The second pillar is connected with the second shaft and extends into the second guiding slot. When the first shaft rotates with respect to the sliding component and moves the first pillar along the first guiding slot, the first pillar drives the sliding component to slide along the first and second shafts and move the second pillar along the second guiding slot, so as to drive the second shaft to rotate with respect to the sliding component.

In an embodiment of the invention, the first sliding portion is slidably disposed on the first shaft along an axial direction of the first shaft, and the second sliding portion is slidably disposed on the second shaft along an axial direction of the second shaft.

In an embodiment of the invention, an extending direction of the first guiding slot inclines with respect to the axial direction of the first shaft, and an extending direction of the second guiding slot inclines with respect to the axial direction of the second shaft.

In an embodiment of the invention, the first guiding slot and the second guiding slot are symmetrical to each other, such that the first shaft and the second shaft are adapted to rotate synchronously.

In an embodiment of the invention, the hinge structure further includes a pivoting base, wherein the first shaft and the second shaft are pivoted to the pivoting base, and the first shaft includes a first blocking portion and the second shaft includes a second blocking portion. The first blocking portion and the second blocking portion are leaned against the pivoting base to prevent the first shaft and the second shaft from moving relatively along the axial direction of the first shaft and the axial direction of the second shaft.

In an embodiment of the invention, the hinge structure further includes a first frame and a second frame, wherein the first frame and the second frame are respectively fixed to the first shaft and the second shaft, and an expanded angle of the first frame with respect to the second frame changes with the rotation of the first shaft and the rotation of the second shaft.

In an embodiment of the invention, the hinge structure is adapted for an electronic device, wherein the electronic device includes a display and a base, and the first frame and the second frame are respectively connected with the display and the base.

In an embodiment of the invention, when the expanded angle is equal to 180 degrees, an extending direction of the hinge structure is parallel to an extending direction of the first frame and an extending direction of the second frame.

In an embodiment of the invention, two metal plates are respectively stamped to form the first guiding slot and the second guiding slot on the two metal plates respectively, and the two metal plates are bent to a sleeve shape to form the first sliding portion and the second sliding portion.

In an embodiment of the invention, the first sliding portion and the second sliding portion are two metal sleeves, and the two metal sleeves are respectively milled to form the first guiding slot and the second guiding slot.

Based on the above, the first shaft and the second shaft of the hinge structure of the invention are respectively connected to the display and the base of the electronic device through the first frame and the second frame. The first shaft and the second shaft are both disposed through the sliding portions and respectively connect the first guiding slot and the second guiding slot of the sliding portions through the first pillar and the second pillar respectively. When the user flips over the display of the electronic device and drives the first shaft to rotate, the first pillar moves along the first guiding slot with the rotation of the first shaft and drives the sliding portion to slide, and the second pillar moves along the second guiding slot, as the sliding portion slides, to drive the second shaft to rotate. Accordingly, as the user flips over the display of the electronic device, the first shaft and the second shaft rotate synchronously to prevent the force applied by the user from causing the hinge structure to perform an unexpected motion, such that the display of the electronic device can be smoothly flipped over between the front side and the rear side of the base with the first shaft and the second shaft.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
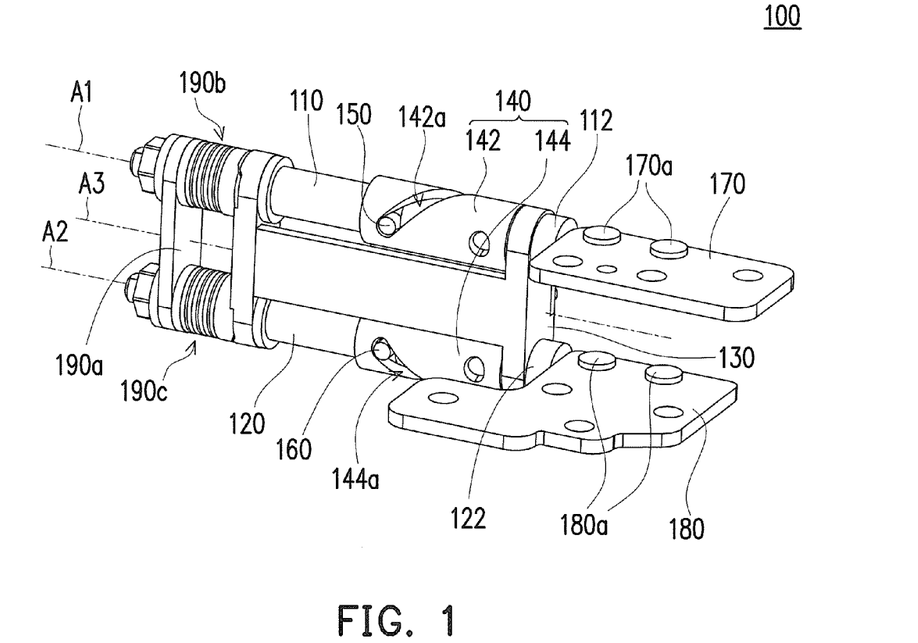
FIG. 1 is a schematic perspective view of a hinge structure according to an embodiment of the invention.
Figure 2:
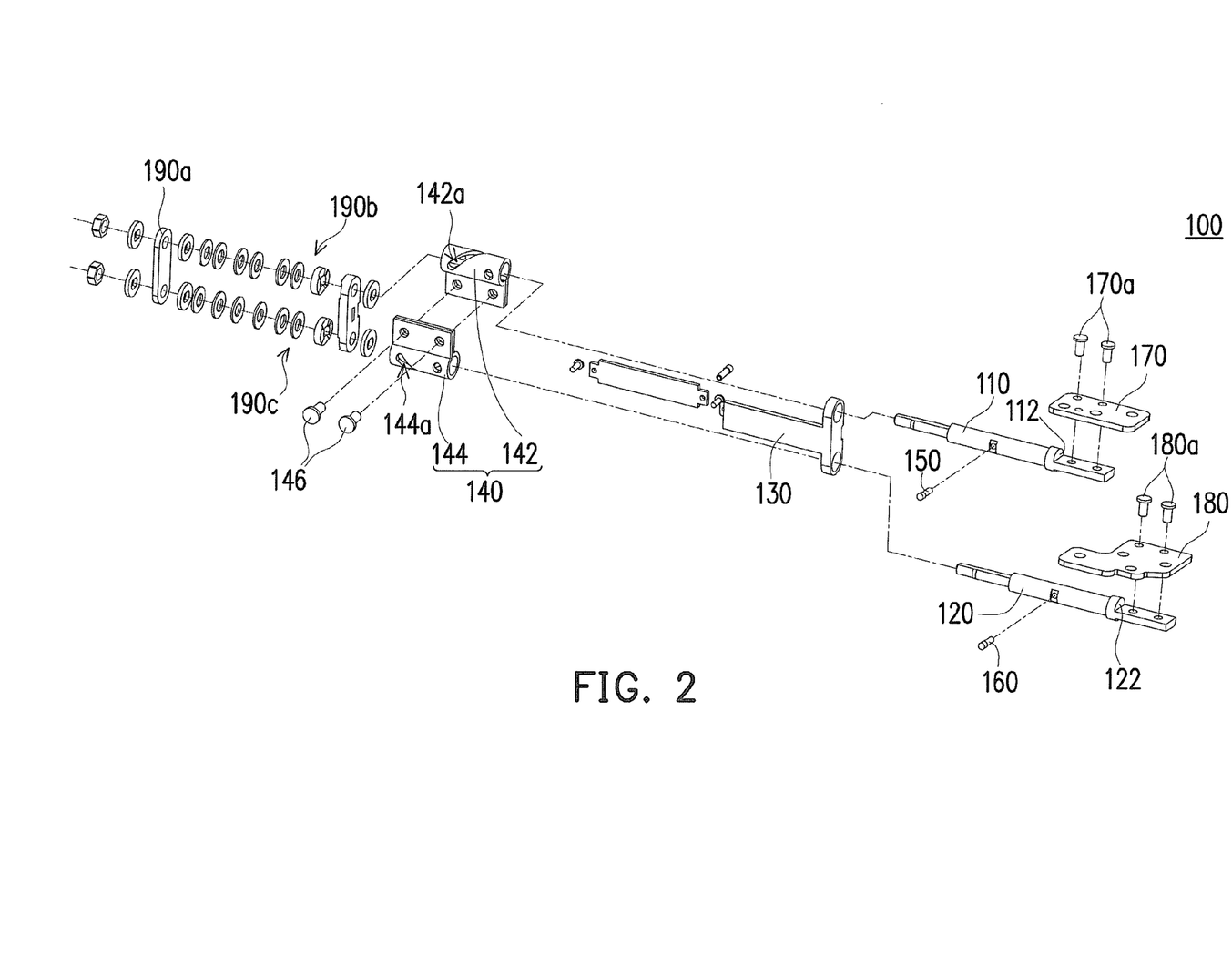
FIG. 2 is a schematic exploded view of the hinge structure of FIG. 1.

FIG. 1 is a schematic perspective view of a hinge structure according to an embodiment of the invention. FIG. 2 is a schematic exploded view of the hinge structure of FIG. 1. With reference to FIG. 1 and FIG. 2, a hinge structure 100 of this embodiment includes a first shaft 110, a second shaft 120, a pivoting base 130, a first frame 170, and a second frame 180. The first shaft 110 and the second shaft 120 are parallel to each other and are pivoted to the pivoting base 130. The first frame 170 and the second frame 180 are respectively fixed to the first shaft 110 and the second shaft 180 by a locking member 170a and a locking member 180a, for example. An expanded angle of the first frame 170 with respect to the second frame 180 changes with the rotation of the first shaft 110 and the rotation of the second shaft 120.

Figure 3:
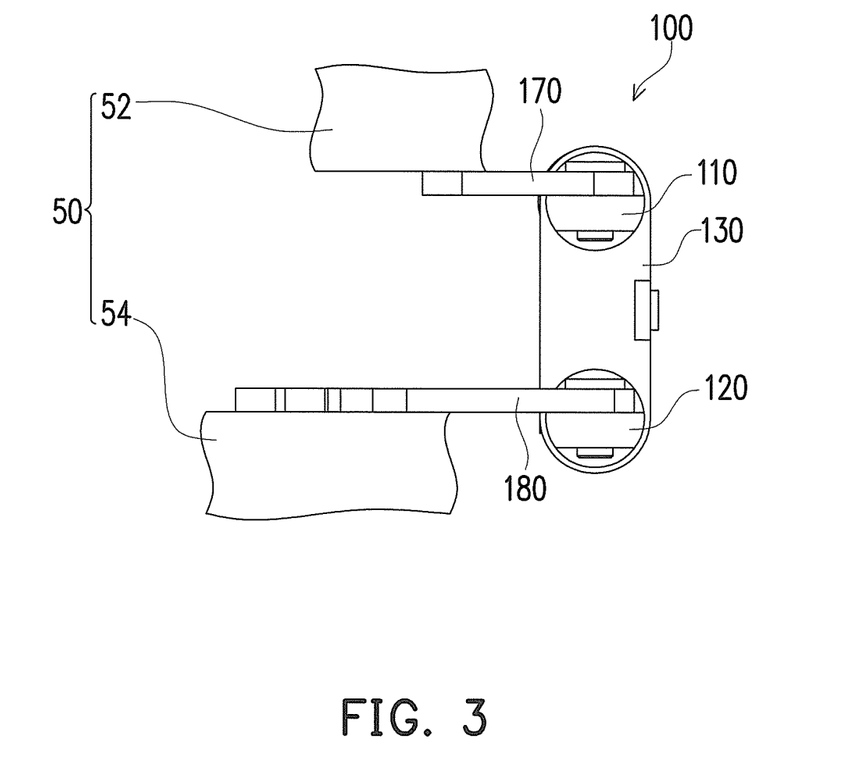
FIG. 3 is a schematic view of the hinge structure of FIG. 1 when applied to an electronic device.
Figure 4A:
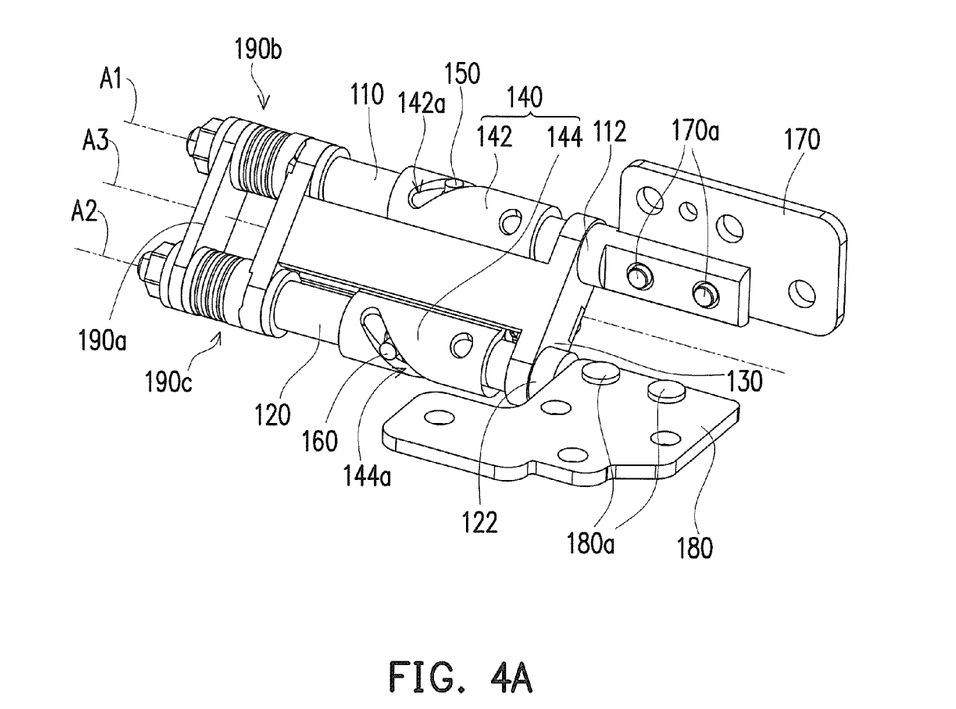
FIG. 4A to FIG. 4D are schematic views illustrating motion of the hinge structure of FIG. 1.
Figure 4B:
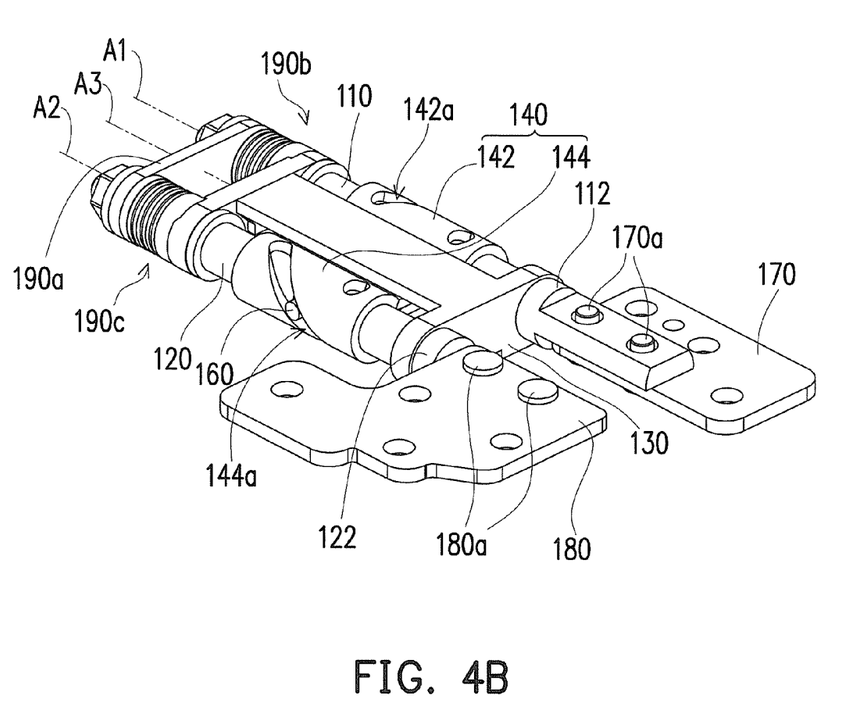
Figure 4C:
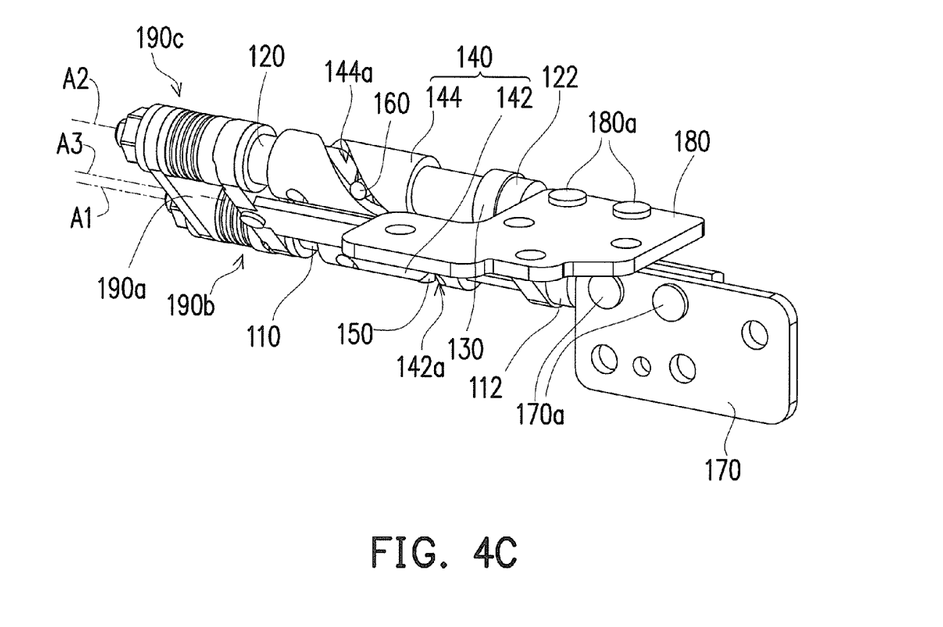
Figure 4D:
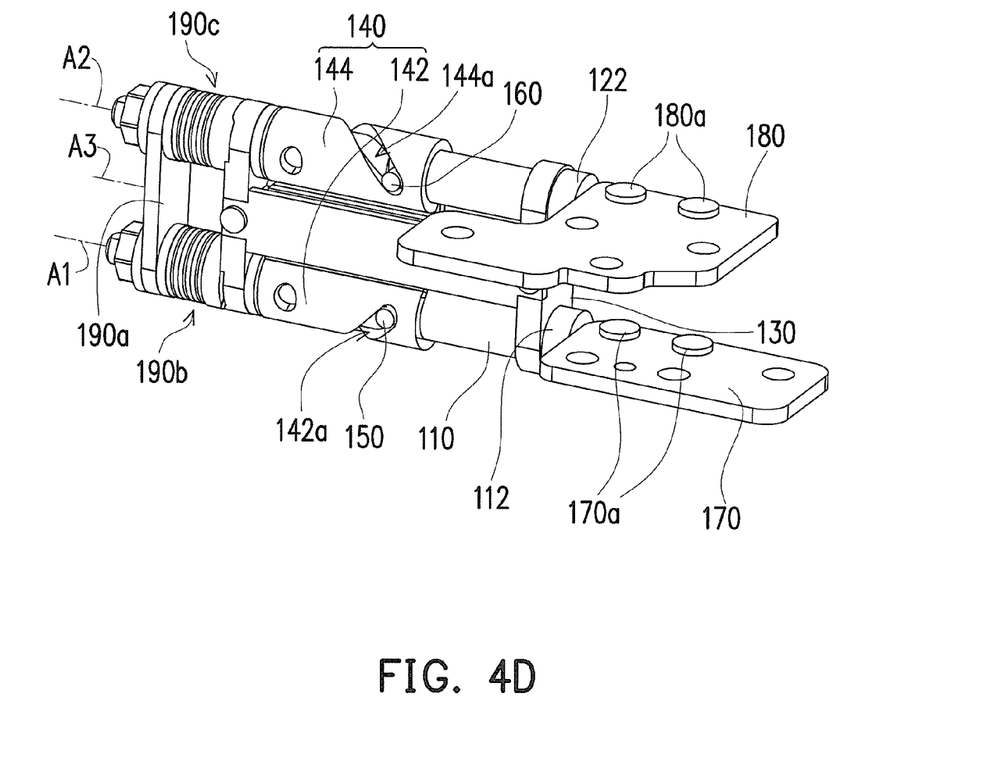

FIG. 3 is a schematic view of the hinge structure of FIG. 1 when applied to an electronic device. As shown in FIG. 3, the hinge structure 100 of this embodiment is applicable to an electronic device 50. The electronic device 50 is a notebook computer, for example, which includes a display 52 and a base 54. The display 52 and the base 54 are respectively connected to the first frame 170 and the second frame 180, so that the display 52 can be flipped over with respect to the base 54 by a motion of the hinge structure 100.

With reference to FIG. 1 and FIG. 2, more specifically, the hinge structure 100 of this embodiment further includes a sliding component 140, a first pillar 150, and a second pillar 160. The sliding component 140 includes a first sliding portion 142 and a second sliding portion 144. The first shaft 110 and the second shaft 120 are respectively disposed through the first sliding portion 142 and the second sliding portion 144, such that the first sliding portion 142 is slidably disposed on the first shaft 110 along an axial direction (an axis A1 of FIG. 1) of the first shaft 110, and the second sliding portion 144 is slidably disposed on the second shaft 120 along an axial direction (an axis A2 of FIG. 1) of the second shaft 120. The first sliding portion 142 has a first guiding slot 142a, and the second sliding portion 144 has a second guiding slot 144a.

An extending direction of the first guiding slot 142a inclines with respect to the axial direction of the first shaft 110, and an extending direction of the second guiding slot 144a inclines with respect to the axial direction of the second shaft 120. The first pillar 150 is connected with the first shaft 110 by locking or other suitable methods, and extends into the first guiding slot 142a. The second pillar 160 is connected with the second shaft 120 by locking or other suitable methods, and extends into the second guiding slot 144a.

FIG. 4A to FIG. 4D are schematic views illustrating motion of the hinge structure of FIG. 1. FIG. 5A to FIG. 5D are schematic views illustrating motion of the hinge structure of FIG. 3. The states shown in FIG. 4A to FIG. 4D respectively correspond to the states shown in FIG. 5A to FIG. 5D. The user may apply a force on the display 52 of the electronic device 50 shown in FIG. 3 to drive and turn the display 52 to the states shown in FIG. 5A to FIG. 5D. When the first shaft 110 rotates with respect to the pivoting base 130 and the sliding component 140 (shown in FIG. 1) with the display 52, the first pillar 150 moves along the first guiding slot 142a of the first sliding portion 142 as shown in FIG. 4A to FIG. 4D. At the same time, an inner wall of the first guiding slot 142a is pushed by the first pillar 150 to drive the sliding component 140 to slide along the first shaft 110 and the second shaft 120, and an inner wall of the second guiding slot 144a of the second sliding portion 144 pushes the second pillar 160 to drive the second pillar 160 to move along the second guiding slot 144a as shown in FIG. 4A to FIG. 4D, so as to drive the second shaft 120 to rotate with respect to the pivoting base 130 and the sliding component 140. Similarly, as the user flips the display 52 of the electronic device 50 from the state of FIG. 5D to the state of FIG. 4, the first shaft 110 also drives the second shaft 120 to rotate with respect to the pivoting base 130 and the sliding component 140 in the aforementioned manner.

Due to the above configuration and motion, when the user flips over the display 52 of the electronic device 50, the first shaft 110 and the second shaft 120 simultaneously rotate with respect to the pivoting base 130 and the sliding component 140, which prevents the force applied by the user from causing the hinge structure to perform an unexpected motion, such that the display 52 of the electronic device 50 is smoothly flipped between a front side and a rear side of the base 54 with the first shaft 110 and the second shaft 120.

Figure 5A:
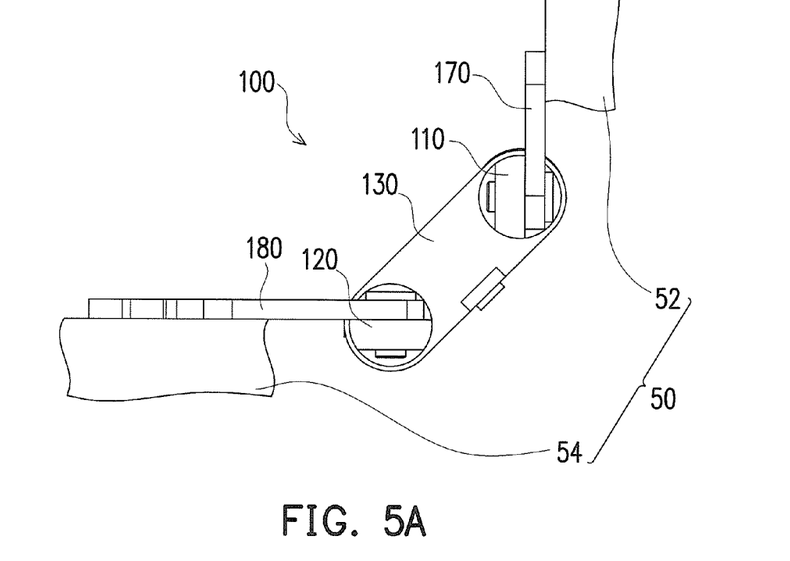
FIG. 5A to FIG. 5D are schematic views illustrating motion of the hinge structure of FIG. 3.
Figure 5B:
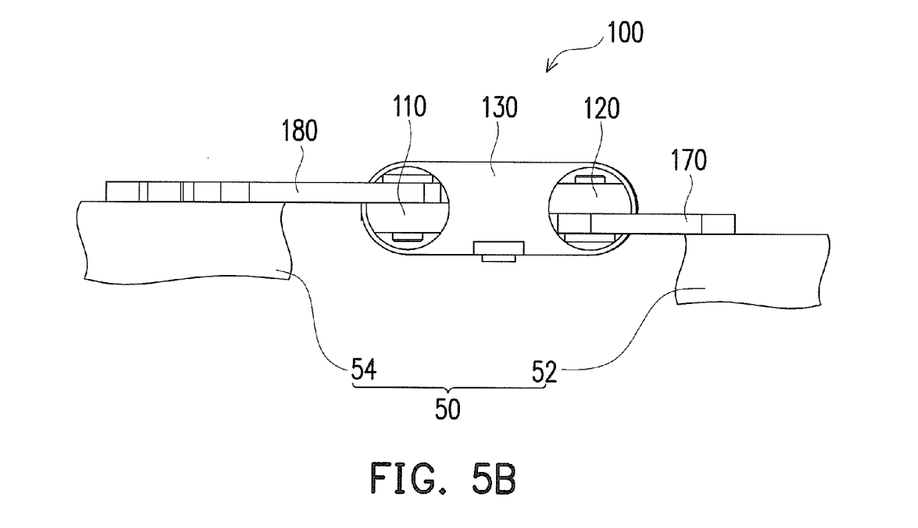
Figure 5C:
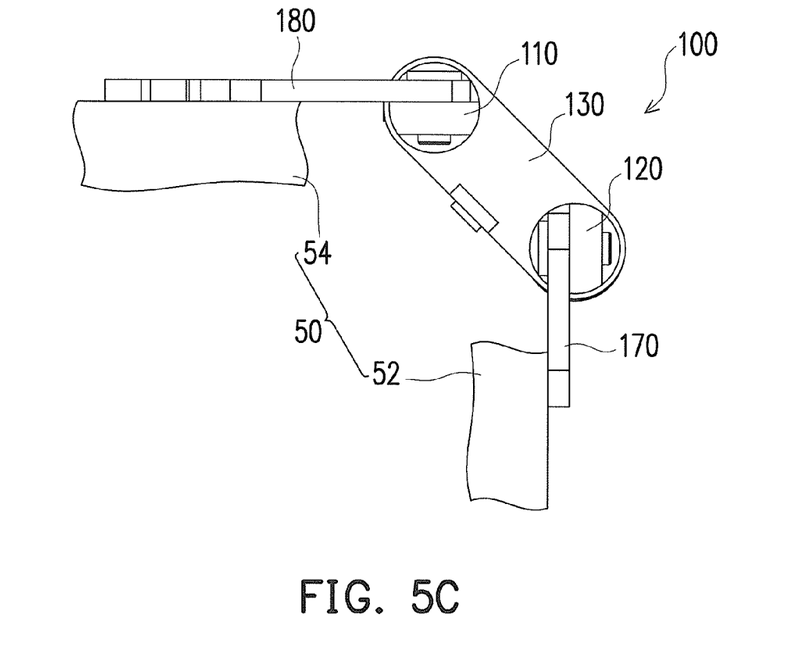
Figure 5D:
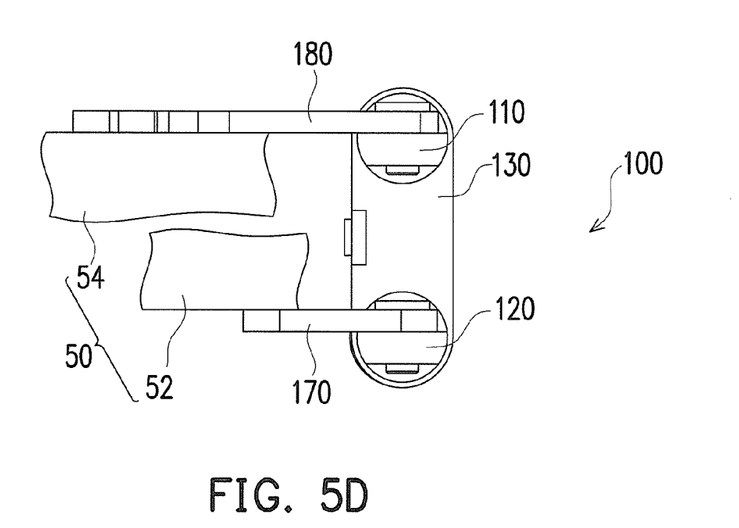

Further, in this embodiment, the first guiding slot 142a of the first sliding portion 142 and the second guiding slot 144a of the second sliding portion 144 are symmetrical to each other along an axis A3, for example, so that the first shaft 110 and the second shaft 120 rotate synchronously with the above motion. The axis A3 is parallel to the axis A1 and the axis A2 and passes through a geometric center of the hinge structure 100, for example. Accordingly, when the expanded angle between the first frame 170 and the second frame 180 is equal to 180 degrees, as shown in FIG. 5B, the hinge structure 100 rotates to a horizontal state corresponding to the synchronous rotation of the first shaft 110 and the second shaft 120, such that an extending direction (i.e. a horizontal direction D shown in FIG. 5B) of the hinge structure 100 is parallel to the extending direction of the first frame 170 and the extending direction of the second frame 180. Thus, the overall structure of the electronic device 50 is smooth and beautiful in this state.

Referring to FIG. 1 and FIG. 2, the first shaft 110 has a first blocking portion 112 and the second shaft 120 has a second blocking portion 122. The first blocking portion 112 and the second blocking portion 122 are leaned against the pivoting base 130, so as to prevent the first shaft 110 and the second shaft 120 from moving relatively along the axial direction of the first shaft 110 and the axial direction of the second shaft 120, such that the hinge structure 100 can be smoothly moved in the states of FIG. 1 and FIG. 4A to FIG. 4D.

Referring to FIG. 1 and FIG. 2, the hinge structure 100 of this embodiment further includes a fixing frame 190a, a torque component 190b, and a torque component 190c. The torque component 190b and the torque component 190c are respectively disposed on the first shaft 110 and the second shaft 120 to provide the hinge structure 100 a proper torsion. The first shaft 110 and the second shaft 120 are disposed through the fixing frame 190a, and the torque components (i.e. the torque component 190b and the torque component 190c) are leaned against the fixing frame 190a, so as to keep the hinge structure 100 firmly.

In this embodiment, the first sliding portion 142 and the second sliding portion 144 of the sliding component 140 are respectively made of two metal plates, for example. More specifically, the two metal plates are respectively stamped to form the first guiding slot 142a and the second guiding slot 144a thereon. Then, the two metal plates are respectively bent to a sleeve shape to form the first sliding portion 142 and the second sliding portion 144 as shown in FIG. 1 and FIG. 2. Moreover, the first sliding portion 142 and the second sliding portion 144 of this embodiment are fixed to each other by a locking member 146 shown in FIG. 2. The invention is not intended to limit the type of the sliding component, an example of which is explained below with reference to the drawings.

Figure 6:
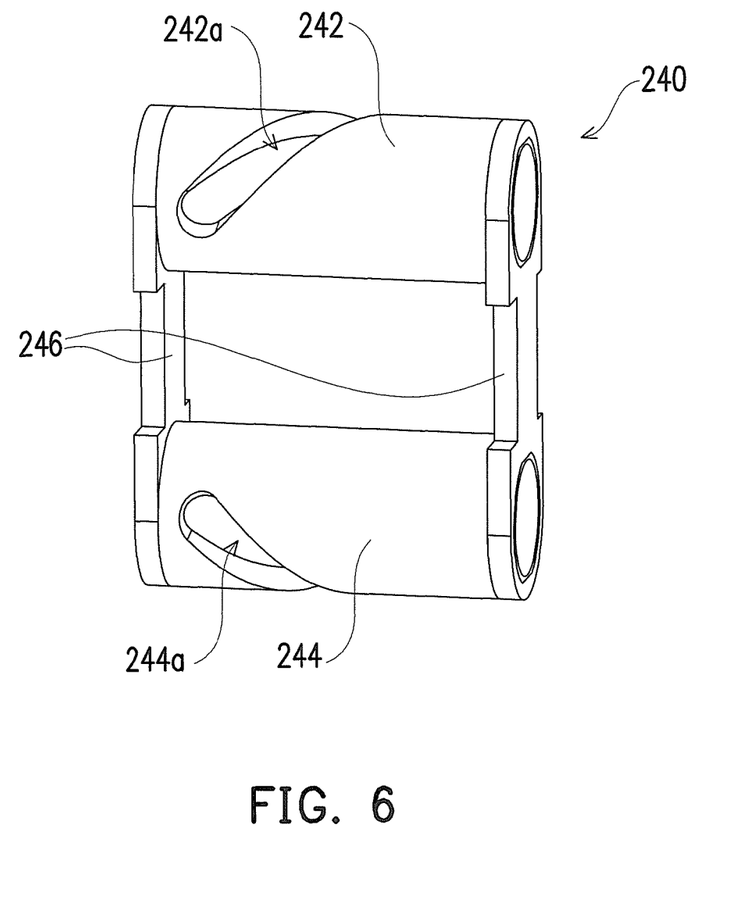
FIG. 6 is a schematic perspective view of a sliding component according to another embodiment of the invention.

FIG. 6 is a schematic perspective view of a sliding component according to another embodiment of the invention. In a sliding component 240 of FIG. 6, a first sliding portion 242, a second sliding portion 244, a first guiding slot 242a, and a second guiding slot 244a are disposed in the same manner as the first sliding portion 142, the second sliding portion 144, the first guiding slot 142a, and the second guiding slot 144a of FIG. 1 and FIG. 2 and function in the same manner. Thus, details are not repeated hereinafter. A difference between the sliding component 240 and the sliding component 140 is that: the first sliding portion 242 and the second sliding portion 244 are two metal sleeves. However, the first guiding slot 242a and the second guiding slot 244a are not formed by stamping. Instead, the first guiding slot 242a and the second guiding slot 244a are respectively formed by milling the two metal sleeves. In addition, the first sliding portion 242 and the second sliding portion 244 of this embodiment are fixed to each other by two fixing plates 246, for example.

To sum up, the first shaft and the second shaft of the hinge structure of the invention are respectively connected to the display and the base of the electronic device through the first frame and the second frame. The first shaft and the second shaft are both disposed through the sliding portions and respectively connect the first guiding slot and the second guiding slot of the sliding portions through the first pillar and the second pillar respectively. When the user flips over the display of the electronic device and drives the first shaft to rotate, the first pillar moves along the first guiding slot with the rotation of the first shaft and drives the sliding portion to slide, and the second pillar moves along the second guiding slot, as the sliding portion slides, to drive the second shaft to rotate. Accordingly, as the user flips over the display of the electronic device, the first shaft and the second shaft rotate synchronously to prevent the force applied by the user from causing the hinge structure to perform an unexpected motion, such that the display of the electronic device can be smoothly flipped over between the front side and the rear side of the base with the first shaft and the second shaft. Moreover, the first guiding slot of the first sliding portion and the second guiding slot of the second sliding portion are designed to be symmetrical, such that the first shaft and the second shaft rotate synchronously with the aforementioned motion. Therefore, when the expanded angle between the first frame and the second frame is equal to 180 degrees, the hinge structure is rotated to the horizontal state corresponding to the synchronous rotation of the first shaft and the second shaft, and as a result, the overall structure of the electronic device is more smooth and beautiful in this state.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A hinge structure, comprising:
   a first shaft;
   a second shaft parallel to the first shaft;
   a sliding component comprising a first sliding portion and a second sliding portion, wherein the first shaft and the second shaft are respectively disposed through the first sliding portion and the second sliding portion, and the first sliding portion comprises a first guiding slot and the second sliding portion comprises a second guiding slot;
   a first pillar connected to the first shaft and extending into the first guiding slot; and
   a second pillar connected to the second shaft and extending into the second guiding slot, wherein when the first shaft rotates with respect to the sliding component and moves the first pillar along the first guiding slot, the first pillar drives the sliding component to slide along the first shaft and the second shaft and moves the second pillar along the second guiding slot, so as to drive the second shaft to rotate with respect to the sliding component.

2. The hinge structure according to claim 1, wherein the first sliding portion is slidably disposed on the first shaft along an axial direction of the first shaft, and the second sliding portion is slidably disposed on the second shaft along an axial direction of the second shaft.

3. The hinge structure according to claim 1, wherein an extending direction of the first guiding slot inclines with respect to an axial direction of the first shaft, and an extending direction of the second guiding slot inclines with respect to an axial direction of the second shaft.

4. The hinge structure according to claim 1, wherein the first guiding slot and the second guiding slot are symmetrical to each other, such that the first shaft and the second shaft are adapted to rotate synchronously.

5. The hinge structure according to claim 1, further comprising a pivoting base, wherein the first shaft and the second shaft are pivoted to the pivoting base, and the first shaft comprises a first blocking portion and the second shaft comprises a second blocking portion, wherein the first blocking portion and the second blocking portion are leaned against the pivoting base to prevent the first shaft and the second shaft from moving relatively along an axial direction of the first shaft and an axial direction of the second shaft.

6. The hinge structure according to claim 1, further comprising a first frame and a second frame, wherein the first frame and the second frame are respectively fixed to the first shaft and the second shaft, and an expanded angle of the first frame with respect to the second frame changes with the rotation of the first shaft and the rotation of the second shaft.

7. The hinge structure according to claim 6, wherein the hinge structure is adapted for an electronic device, and the electronic device comprises a display and a base, and the first frame and the second frame are respectively connected with the display and the base.

8. The hinge structure according to claim 6, wherein when the expanded angle is equal to 180 degrees, the hinge structure is in a horizontal state where an extending direction of the hinge structure is parallel to an extending direction of the first frame and an extending direction of the second frame.

9. The hinge structure according to claim 1, wherein the first guiding slot and the second guiding slot are formed by stamping two metal plates respectively, and the first sliding portion and the second sliding portion are formed by bending said metal plates into two metal sleeves.

10. The hinge structure according to claim 1, wherein the first sliding portion and the second sliding portion are two metal sleeves, and the two metal sleeves are respectively milled to form the first guiding slot and the second guiding slot.

* * * * *